United States Patent [19]
Brawne et al.

[11] Patent Number: 6,021,195
[45] Date of Patent: Feb. 1, 2000

[54] TELEPHONE WITH CONFIGURABLE EAR PIECE

[75] Inventors: Nicholas Brawne; Yutaka Hasegawa, both of San Francisco, Calif.

[73] Assignee: Sony Corporation of Japan, Tokyo, Japan

[21] Appl. No.: 08/988,661

[22] Filed: Dec. 11, 1997

[51] Int. Cl.[7] .................................................. H04M 1/00
[52] U.S. Cl. ............................................................ 379/433
[58] Field of Search ................................... 379/428, 433, 379/447, 430; 455/90, 575; 381/386

[56] References Cited

U.S. PATENT DOCUMENTS

| 2,152,915 | 4/1939 | Pye | 379/433 |
| 5,136,639 | 8/1992 | Brito | 379/447 |
| 5,715,311 | 2/1998 | Sudo et al. | 379/433 |

*Primary Examiner*—Jack Chiang
*Attorney, Agent, or Firm*—Wagner, Murabito & Hao LLP

[57] ABSTRACT

A telephone which includes a telephone body adapted to receive different earpieces is disclosed. A variety of different earpieces may be coupled to the telephone body. In one embodiment the telephone body has an opening formed in it that exposes a connector receptacle adapted to mate with a connector of an earpiece. By inserting the earpiece into the opening, the connector of an earpiece mates with the connector receptacle so as to mechanically and electrically attach the earpiece to the telephone body. Alternatively, screw threads are used to attach the earpiece to the telephone body. Some earpieces conform generally to the contours of the telephone body and others extend from the telephone body. The ability to couple different earpieces to the telephone body allows for the easy and inexpensive manufacture of telephones having an earpiece conforming to the specific needs of a user.

18 Claims, 14 Drawing Sheets

TELEPHONE WITH CONFIGURABLE EAR PIECE

TECHNICAL FIELD

This invention relates to the field of communication devices. More particularly, the present invention relates to an improved telephone.

BACKGROUND ART

Older, traditional telephones typically include a handset which includes a large earpiece and a large mouthpiece. The large earpiece is intended to fit around the user's ear such that the use of the telephone is quite comfortable. The large mouthpieces of older telephones is intended to be positioned close to the user's mouth such that the user may cradle the telephone with the earpiece comfortably positioned against the user's ear. The large earpiece and large mouthpiece comfortably accommodates users of varying facial structure and ear shape and location variations.

Early cellular telephones included a housing which connected to a handset. The handset connected with the housing via a phone cable. The housing typically included a cradle for receiving the handset. In these early cellular telephones, most of the electronics and the battery were contained within the housing and only a speaker and a microphone were contained within the handset. The handsets of these early cellular telephones were shaped much like older, conventional telephones and they tended to have large earpieces and large mouthpieces. Thus, these prior art telephones were comfortable for use by persons having different respective facial structures and ear shapes and location variations.

As cellular telephones developed over the years, their size has steadily decreased. This has been partly due to the integration of many of the telephone's electronic functions into semiconductor devices such as digital signal processors specifically designed to process the electrical operations of a cellular telephone. In addition, smaller, more powerful batteries have been developed. This has allowed cellular telephone makers to adopt one piece designs. In these one piece designs, all of the functions of the handset and the housing are integrated into a one-piece handheld unit.

Typically, these one-piece integrated units have a front surface which is relatively flat so as to accommodate a keypad, a display, and several function keys. The earpiece of these integrated units is typically a small, shallow bowl-shaped indention in the front surface. The interior of the bowl-shaped indentation has openings formed therein so as to allow sound from a speaker to be emitted. These earpieces are typically smaller and less contoured than older earpieces contained within handsets. In these integrated units the speaker is typically disposed within an opening in the bottom of the front surface of the telephone. Thus, the user is no longer able to cradle the telephone comfortably against their ear and mouth. In addition, the small bowl-shaped indention is not readily felt by the user. Therefore, the user may not have the speaker optimally located with respect . to the user's ear.

Though cellular telephones have become smaller and smaller, the typical cellular telephone is still larger than a user's pocket. This requires a user to either carry the cellular telephone in a bag or briefcase, or carry the cellular telephone in their hand. However, these methods of carrying a cellular telephone are not as convenient as carrying the cellular telephone in the user's pocket. Thus, cellular telephone manufacturers have attempted to make cellular telephones which will fit into a user's pocket.

Recently, cellular telephone manufacturers have developed designs which fit within a users pocket. One pocket-sized conventional cellular telephone is a two piece design. The two-piece conventional cellular telephone is comprised of a main body and a downwardly extending boom. The boom has a microphone disposed near the end thereof. In order for the cellular telephone to fit into a pocket, and also comply with the size requirements for a keypad and a display, one cellular telephone design locates the boom on one side of the cellular telephone. When a user places the speaker near one ear, the boom extends down far enough such that microphone is at the same level as the user's mouth.

However, as telephones have become smaller, the designs of the telephones have become less "universally" comfortable for the average user. More particularly, some designs are comfortable for some users and uncomfortable for other users. This has led to consumers demanding a product which is more comfortable to use. In response, cellular telephone manufacturers have introduced different telephone designs to meet the needs of the different consumers. However, each telephone design can only accommodate the needs of a small segment of users. Thus, many different telephone designs must be manufactured and stocked in order to accommodate the needs of consumers. This makes the development of different designs of telephones to accommodate the needs of different users expensive and time consuming.

Recently, one cellular telephone manufacturer has developed a telephone design that attempts to accommodate different respective facial structures and ear location variations. This radio telephone design is detailed in U.S. Pat. No. 5,461,672, which describes a slidable earpiece which slides up and down in order to accommodate the respective distance between the ear and mouth of various users. Although this type of telephone design accommodates the respective distance between the ear and the mouth of various users in a single telephone design, it does not fully accommodate different facial structures and ear structures associated with various users.

Much of the perceived comfort that a user ascribes to a particular telephone design is due to the comfort of the earpiece. In particular, it is important to accommodate different sizes and shapes of ears. In addition, it is important to accommodate different user tastes regarding comfort, functionality, and appearance.

Thus, what is needed is a telephone which can accommodate different ear structures and different facial structures. In addition, a telephone which is comfortable to use is required. Furthermore, a telephone which is inexpensive to manufacture and which has a earpiece which can accommodate different user tastes regarding comfort, functionality and appearance is required. The present invention meets the above needs.

DISCLOSURE OF THE INVENTION

The present invention provides a telephone which is small enough to fit into a user's pocket and which may be comfortably operated by users having different respective facial structures and different respective ear shapes and sizes.

A telephone is disclosed which includes a telephone body adapted to receive different earpieces is disclosed. Multiple different earpieces are disclosed which may be coupled to the telephone body in order to form a telephone that can accommodate the needs of a particular facial structure and ear size and shape.

In one embodiment, the telephone includes a boom which is pivotally connected to the telephone body such that the boom may be pivoted from a retracted position into an extended position. In the retracted position, the boom fits against the telephone body such that a compact profile is obtained. The telephone is small enough to be placed into a user's pocket when the boom is in the retracted position. This is due, in part, to the reduced height of the telephone which is made possible by the retracting boom.

The telephone of the present embodiment also includes an antenna, a speaker, a display, function keys, and a keypad. The speaker is located on the front side of the telephone body as are the display, the function keys, and the keypad. The speaker is located near the top of the telephone body.

In one embodiment, the telephone includes an opening in the front surface of the telephone wherein the opening is adapted to receive different earpieces. A connector receptacle is disposed within the opening and is electrically coupled to the electrical circuitry of the telephone. An earpiece which includes a connector adapted to mate with the connector receptacle is inserted into the opening such that the connector engages the connector receptacle, thereby electrically and mechanically coupling the earpiece to the telephone body. This produces a telephone that accommodates the needs of a particular facial structure and ear size and shape.

In order to produce a telephone that accommodates a different facial structure and ear size and shape, a different earpiece is coupled to the telephone body. Thus, there is no need to design multiple telephone bodies. One telephone body may be used to produce a telephone that accommodates the needs of multiple users. Hence, the present telephone is inexpensive to manufacture because only one telephone body design needs to be manufactured. In addition, the cost of design and prototype development is reduced as there is no need to design multiple complete telephones. Rather, only the designs of different earpieces need be developed.

The telephone of the present invention may be easily and quickly modified by replacing a particular earpiece with a different earpiece. This ability reduces losses resulting from obsolete inventory as designs and needs change. More specifically, a telephone having an undesirable or unpopular configuration may be quickly and easily modified by replacing the outdated or unwanted earpiece.

In one embodiment, the earpieces are manufactured separately such that each individual user may determine the earpiece configuration of their telephone. This allows a user to personally and easily configure their telephone to meet their facial structure, ear size, and ear shape. Hence the present embodiment allows a user to configure the telephone for maximum comfort. In addition, each individual user may change the earpiece of the telephone as desired to accommodate their needs.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
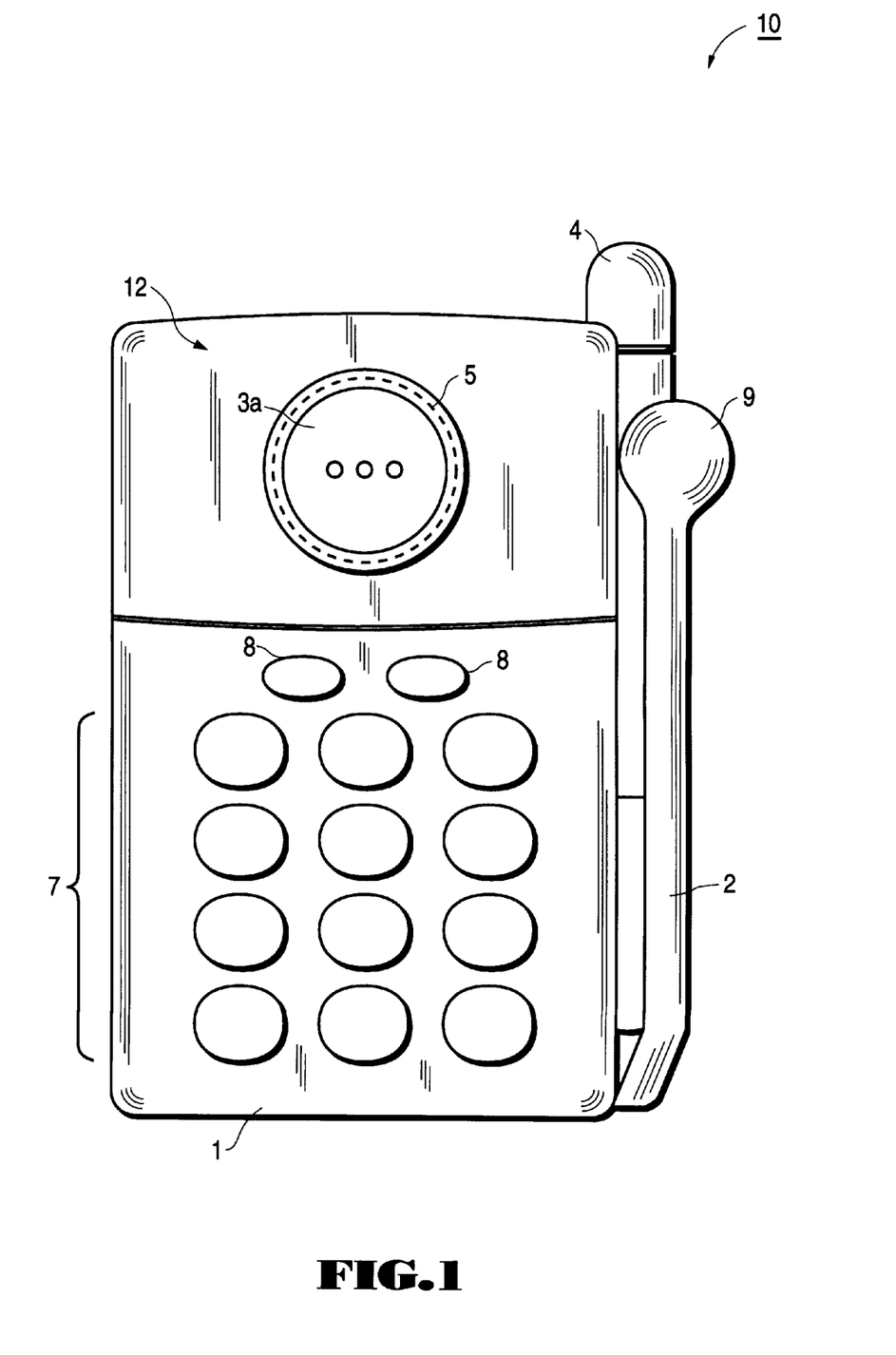
FIG. 1 is a front view of a telephone having a configurable earpiece in accordance with the present invention.

FIG. 1 shows telephone 10 which includes telephone body 1. Telephone body 1 includes boom 2 which extends along one side of telephone body 1 and is attached to telephone body 1 such that boom 2 may be pivotally extended and retracted. Telephone 10 also includes microphone 9 which is located on one end of boom 2. Microphone 9 is electrically coupled to the electronic circuits of telephone 10.

Telephone 10 of FIG. 1 also includes keypad 7 which is disposed within telephone body 1. In one embodiment, keypad 7 is a standard 12-key alphanumeric keypad. Telephone 10 also includes electronic circuitry (not shown) which is contained within telephone body 1 and which electrically connects to keypad 7. This allows a user to input data into telephone 10 by operating keypad 7. Telephone 10 also includes a battery (not shown) which is electrically coupled to the electronic circuitry for providing power to telephone 10. In one embodiment, telephone 10 is programmable such that frequently used telephone numbers may be stored electronically within the electronic circuitry of telephone 10 by operating the alphanumeric keys of keypad 7.

Continuing with FIG. 1, telephone 10 is also shown to include antenna 4 which is coupled to the electronic circuitry of telephone 10. Antenna 4 receives and transmits radio signals. This provides for communication between telephone 10 and a cellular transmission and reception facility.

Telephone 10 of FIG. 1 also includes function keys 8. Function keys 8 are connected to the electronic circuitry of telephone 10. In one embodiment, function keys 8 include a send key which is operable by a user to initiate a cellular connection using telephone 10. In one embodiment, function keys 8 also include an end key which is operable by a user to end transmission and disconnect a cellular connection.

With reference again to FIG. 1, telephone body 1 includes a front surface 12. Earpiece 3a, keypad 7, and function keys 8 are attached to front surface 12 of telephone body 1.

Figure 2:
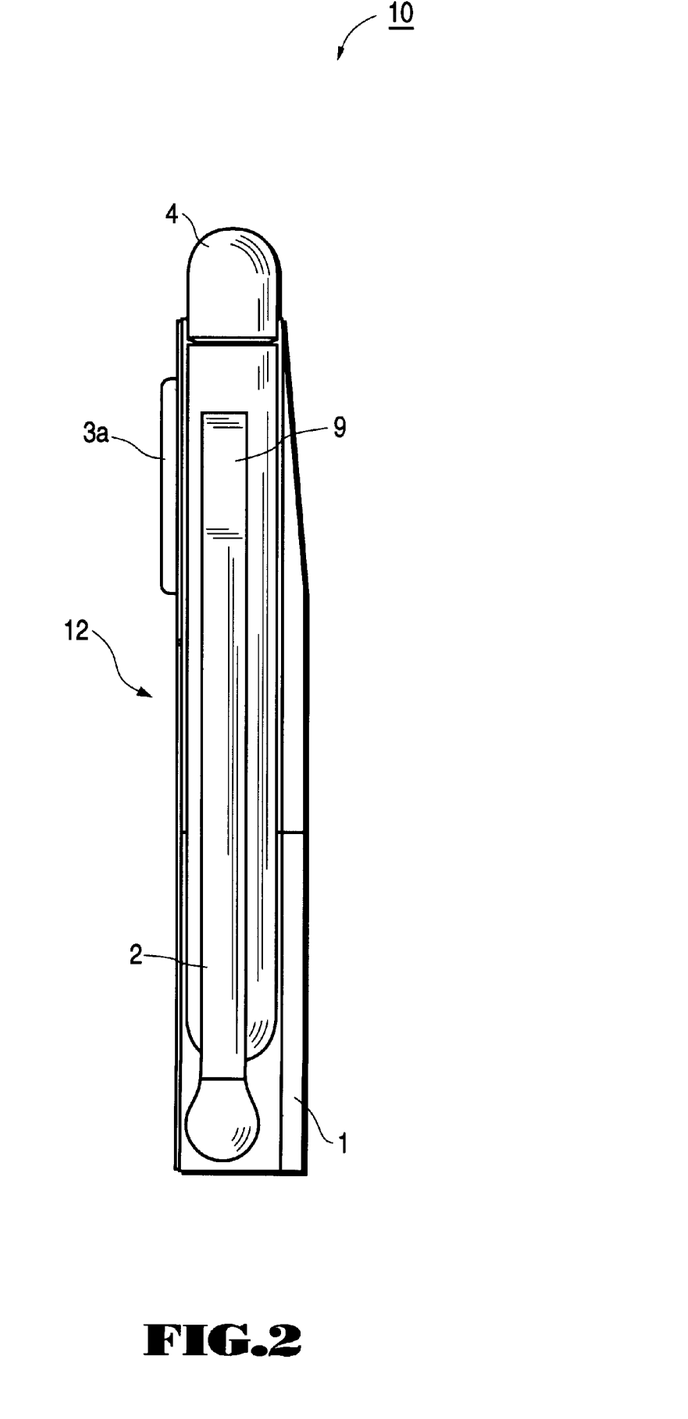
FIG. 2 is a side view of the telephone of FIG. 1 in accordance with the present invention.

In the embodiment shown in FIG. 1, earpiece 3a is attached to telephone body 1 and is encircled by rubber gasket 5. Earpiece 3a is electrically connected to the electronic circuitry of telephone 10 such that sound is projected from a speaker contained in earpiece 3a during the operation of telephone 10. With reference now to FIG. 2, it can be seen that earpiece 3a projects slightly from the front surface of telephone body 1. Earpiece 3a is at a great enough distance from microphone 9 when boom 2 is extended so as to allow a user to place telephone 10 up to the side of their face and have earpiece 3a disposed near the user's ear while microphone 9 is near the user's mouth. Although gasket 5 is comprised of rubber in the present embodiment, the present invention is also well suited to using other materials (e.g. neoprene, plastic, leather, foam rubber, and the like).

In the embodiment shown in FIGS. 1–2 gasket 5 is disposed between earpiece 3a and telephone body 1. In one embodiment gasket 5 forms an airtight seal so as to prevent moisture from entering into the interior of telephone body 1. Alternatively, gasket 5 may be designed to absorb shock.

Figure 3:
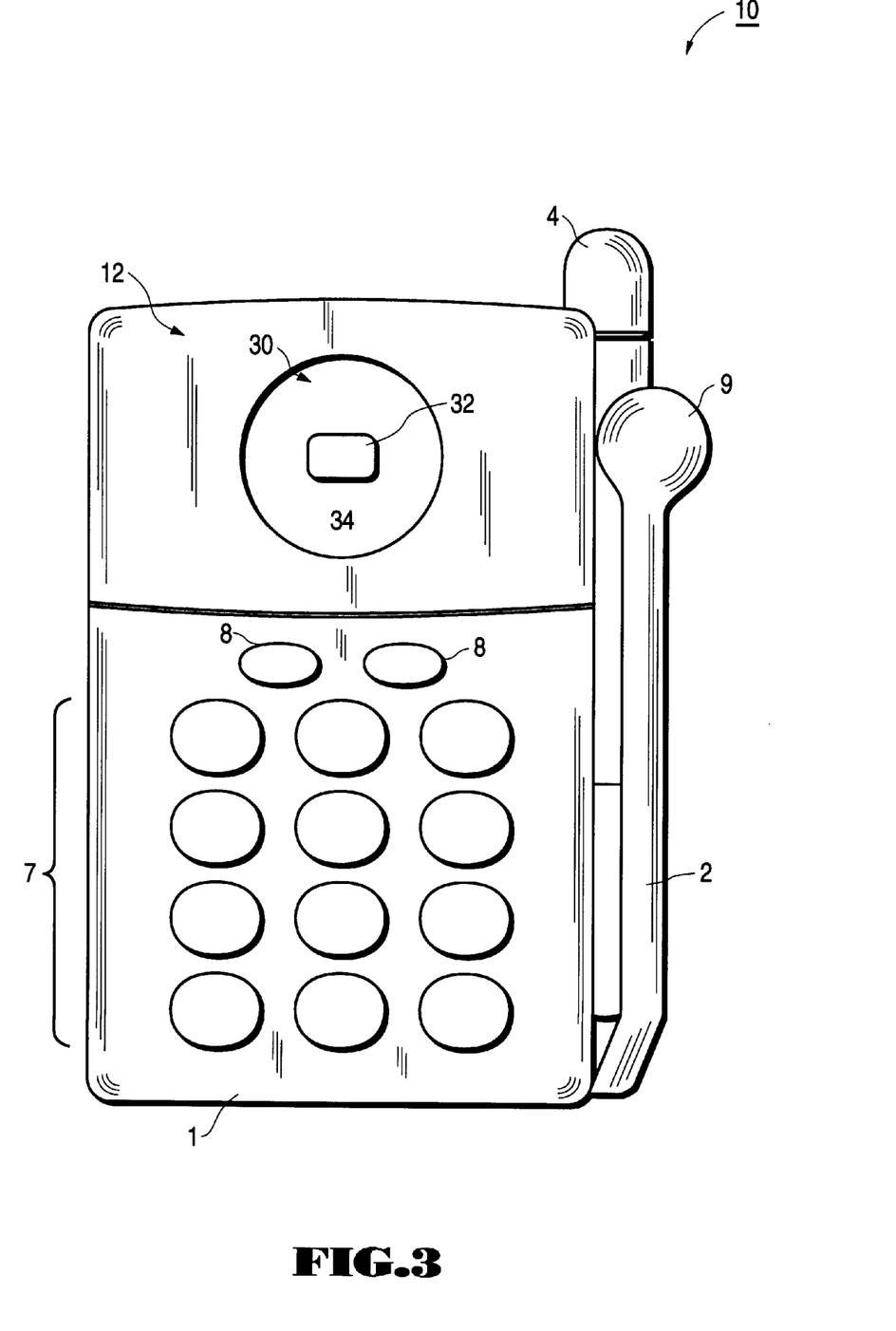
FIG. 3 is a front view of a telephone body adapted to receive a configurable earpiece in accordance with the present invention.

FIG. 3 shows a front view of telephone body 1 with earpiece 3a and gasket 5 removed so as to expose opening 30 and connector receptacle 32 within front surface 12 of telephone body 1. Opening 30 and connector receptacle 32 form a telephone speaker receptacle adapted to receive earpieces such as earpiece 3a shown in FIGS. 1–2. Because opening 30 can receive different earpieces, any of a number of different configurations of telephone 10 may be achieved by inserting different earpieces into opening 30. This allows for the adaptation of a single telephone body such that the needs of different users can be accommodated.

Figure 4:
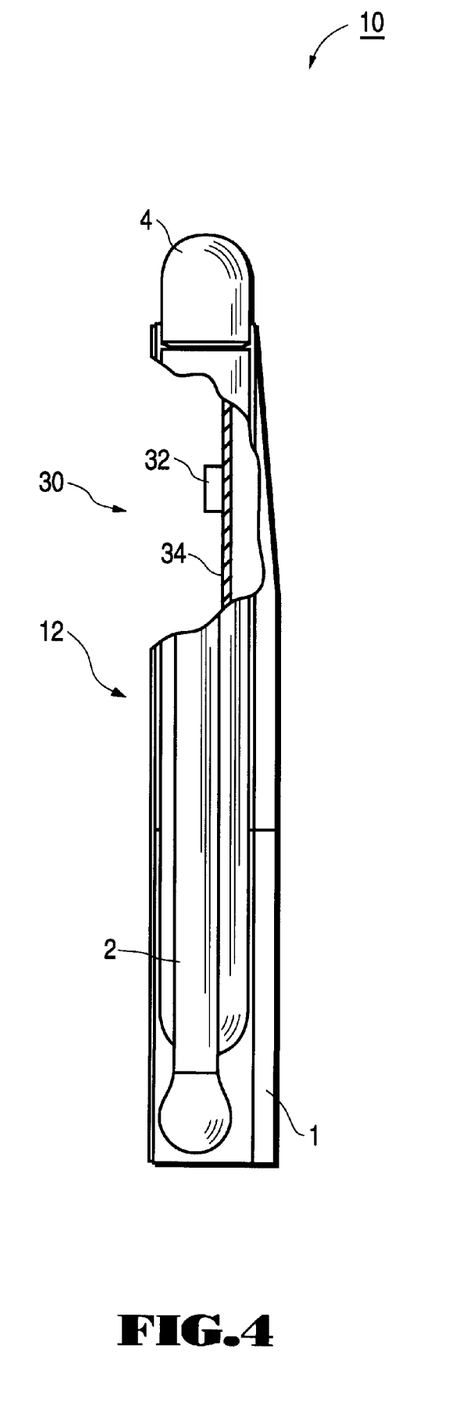
FIG. 4 is a side cut-away view of the telephone of FIG. 3 in accordance with the present invention.

Continuing with FIG. 3, connector receptacle 32 is disposed within opening 30 such that, upon the insertion of earpiece 3a of FIGS. 1–2 into opening 30, electrical connection is made between connector receptacle 32 and earpiece 3a. With reference to FIG. 4, connector receptacle 32 is attached to and is electrically connected to circuit board 34 which contains many of the electrical circuits of telephone 10. In one embodiment, connector receptacle 32 is a low profile connector receptacle that mounts to circuit board 34 so as to securely holds earpiece 3a within opening 30.

In one embodiment, gasket 5 of FIG. 1 fits around earpiece 3a such that earpiece 3a and gasket 5 may be installed into telephone body 1 by simultaneous insertion of earpiece 3a and gasket 5 into opening 30 of FIGS. 3–4. Alternatively, gasket 5 may fit within opening 30 such that earpiece 3a is installed by first inserting gasket 5 into opening 30 and then installing earpiece 3a into opening 30.

Figure 5A:
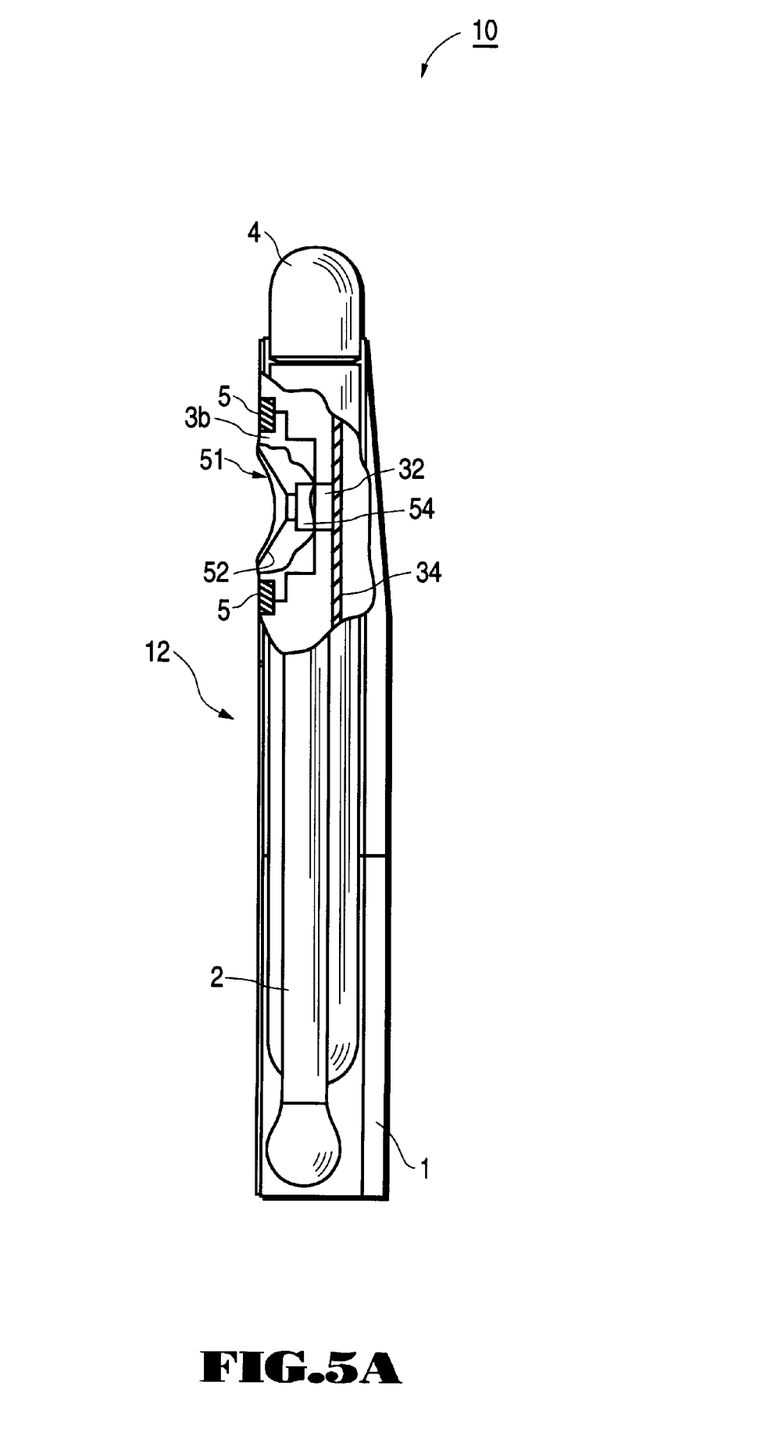
FIG. 5A is a side cut-away view of a telephone having a configurable earpiece coupled thereto in accordance with the present invention.
Figure 5B:
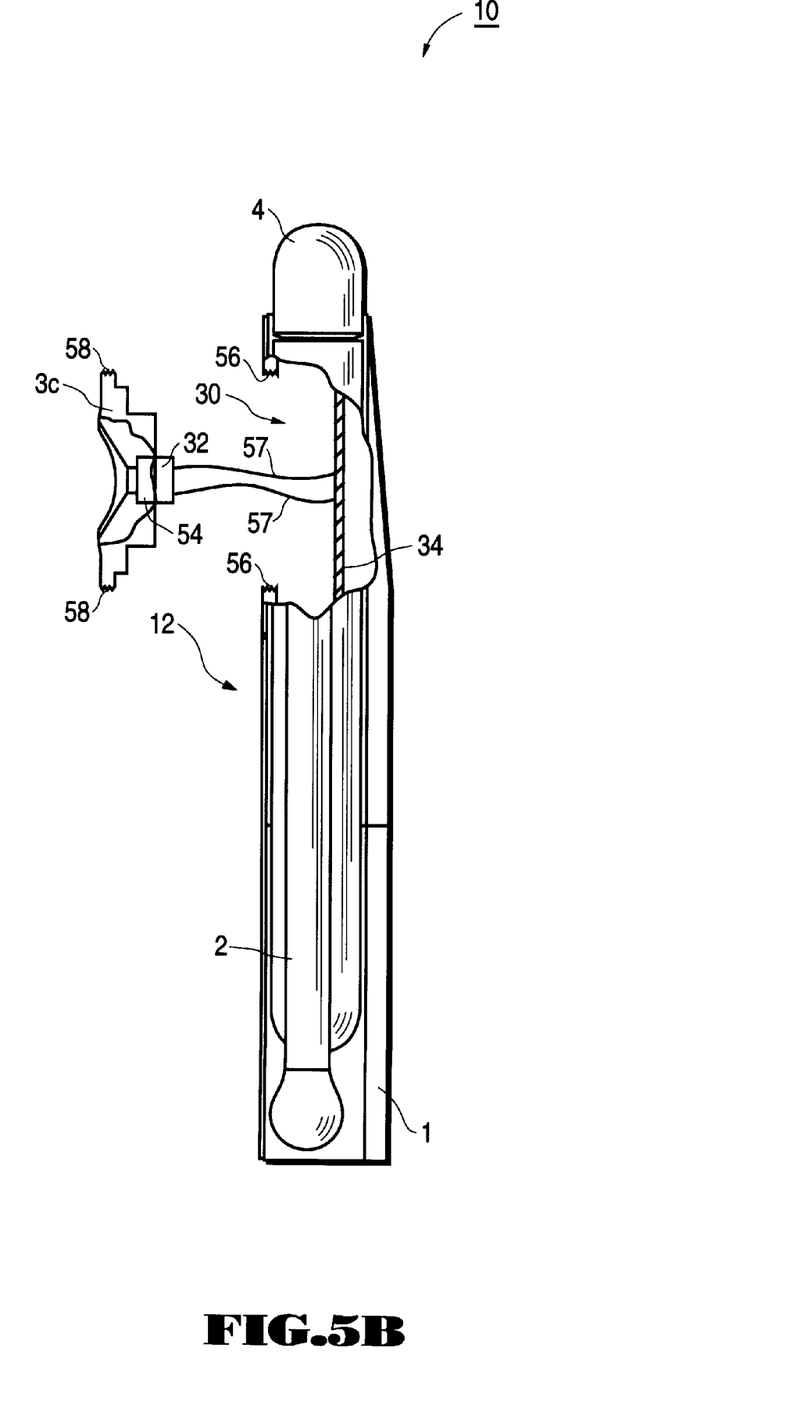
FIG. 5B is an exploded side cut-away view of a telephone having a configurable earpiece coupled thereto that screws into the telephone body in accordance with the present invention.

FIG. 5A shows an embodiment in which a different earpiece, shown as earpiece 3b, is coupled to telephone body 1. The top surface of earpiece 3b is shown to be flush with front surface 12 of telephone body 1. In this embodiment, the center region of earpiece 3b includes a bowl-shaped recession 51 which allows a user to easily couple the earphone to the user's ear. Earpiece 3b is shown to include speaker 52 and connector 54. Connector 54 is electrically connected to speaker 52. Thus, when connector 54 is mated to connector receptacle 32, as is shown in FIG. 5A, speaker 54 is electrically coupled to the electrical circuits of telephone 10.

In the embodiment of FIG. 5A, connector receptacle 32 is securely attached to circuit board 34. Because earpiece 3b is coupled to connector receptacle 32 by connector 54, earpiece 3b is held securely in place. Because gasket 5 is attached to earpiece 3b, gasket 5 is also securely held in place.

Any of a number of different connection mechanisms may be used to electrically and mechanically connect the ear pieces 3a and 3b of FIGS. 1–5 to telephone body 1. In an alternate embodiment illustrated in FIG. 5B, earpiece 3c is attached to telephone body 1 using a connection mechanism wherein earpiece 3c screws into telephone body 1. In this embodiment, connector receptacle 32 is attached to circuit board 34 by electrical wires 57. This allows connector receptacle 32 to be extended out of opening 30. In this embodiment the side surfaces of opening 30 are threaded, shown generally as threads 56. Earpiece 3c includes threaded surfaces 58 which are adapted to engage threads 56. Earpiece 3c is electrically coupled to telephone body 1 by plugging connector recptacle 32 into connector 54. Then, earpiece 3b is screwed into the opening of opening 30. More specifically, threaded surfaces 58 engage threads 56 so as to secure earpiece 3c to telephone body 1.

Figure 6:
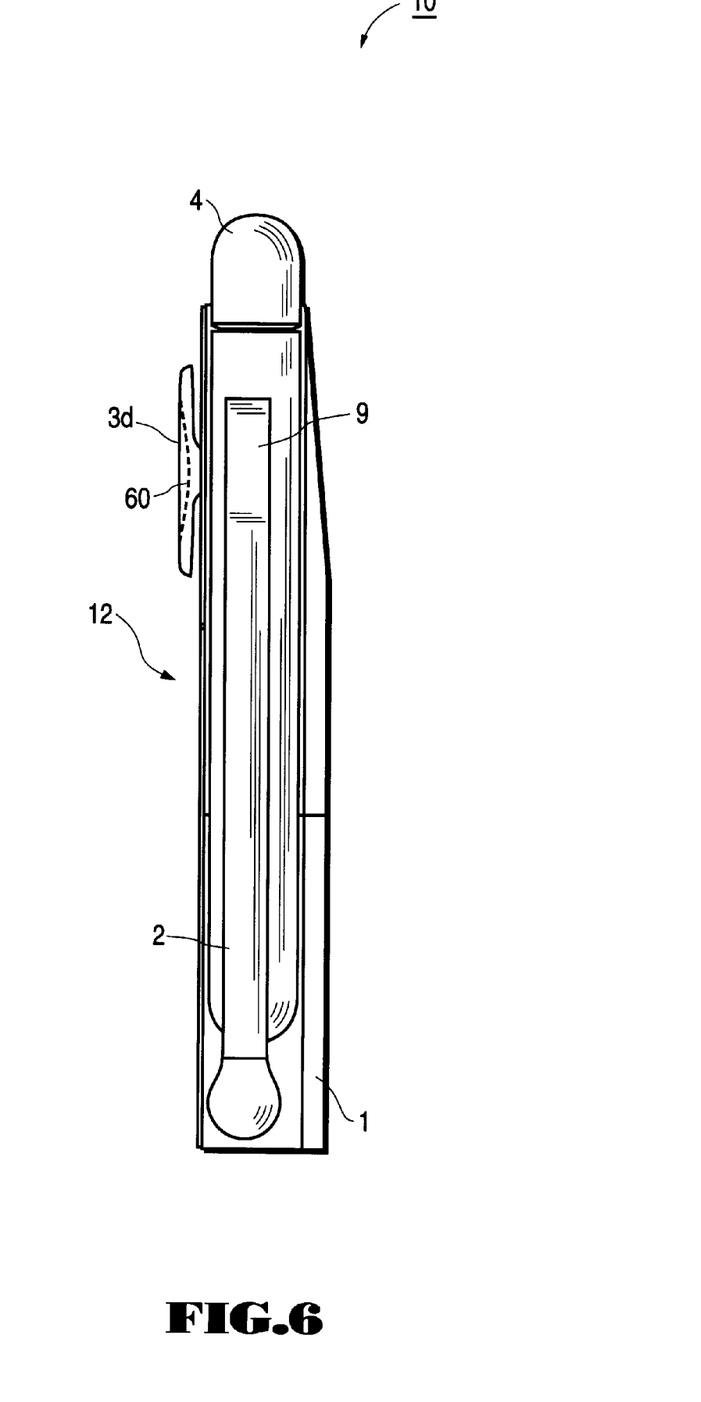
FIG. 6 is a side view of a telephone having a configurable earpiece that extends from the front surface of the telephone body in accordance with the present invention.

With reference now to FIG. 6, an earpiece 3d which extends from front surface 12 is shown to be coupled to telephone body 1. Earpiece 3d is shown to expand in size as it extends away from front surface 12 of telephone body 1 such that it expands to a comfortable dimension for coupling directly to the user's ear. In one embodiment, the center of earpiece 3d has a dome shaped recession 60 such that a user may easily couple earpiece 3d to the user's ear.

Figure 7:
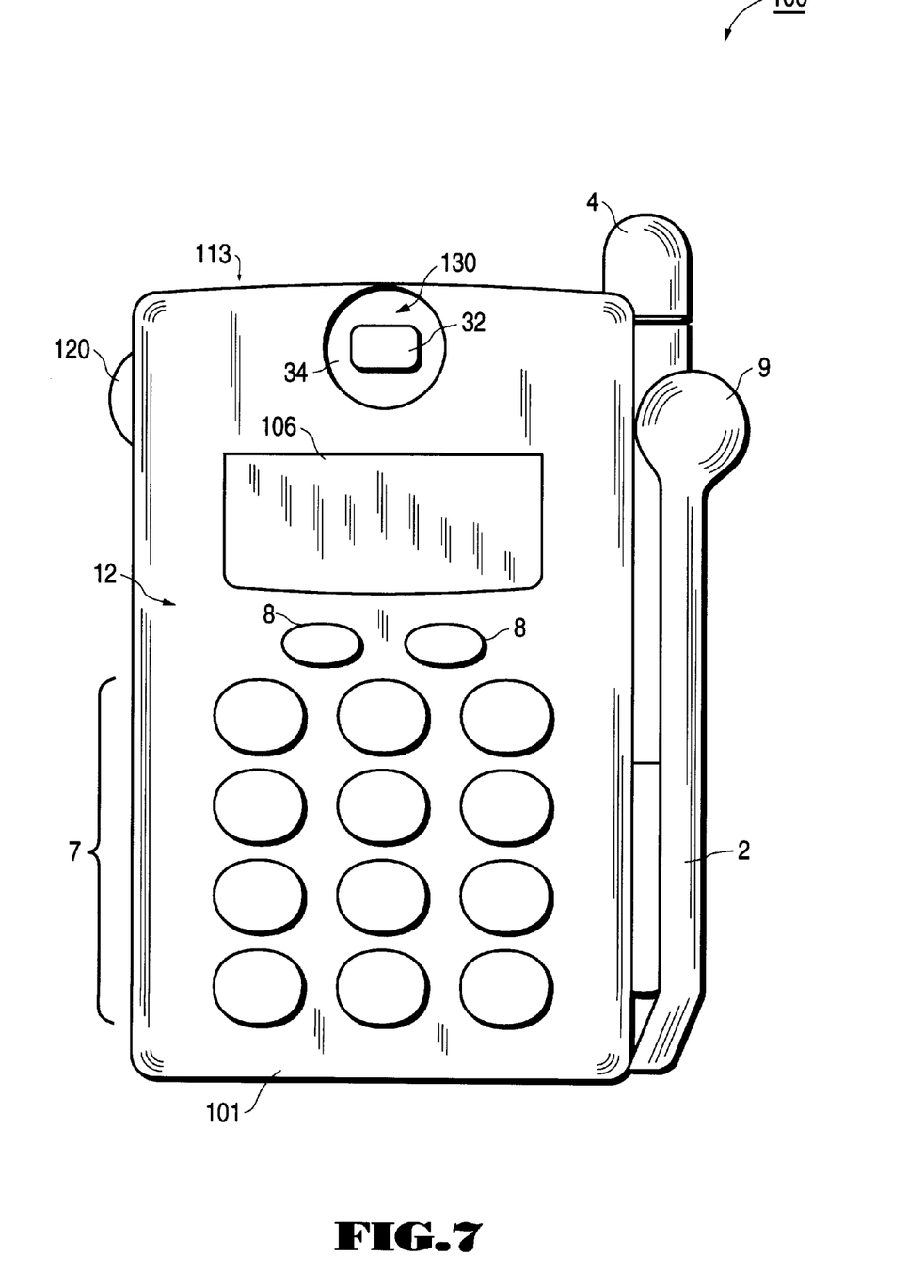
FIG. 7 is a front view of a telephone adapted to receive a configurable earpiece that attaches near the top of the telephone body in accordance with the present invention.
Figure 8:
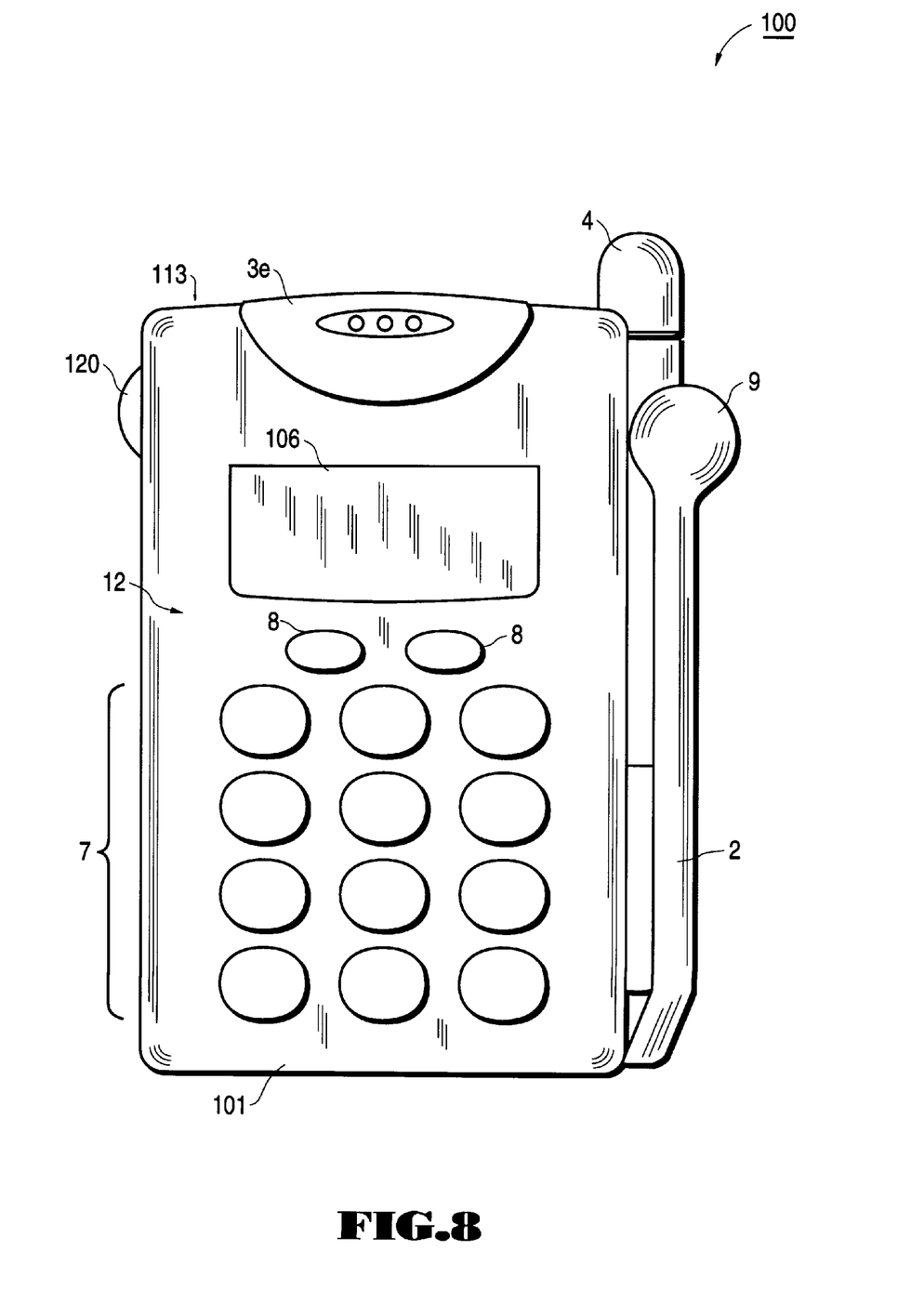
FIG. 8 is a front view of a telephone with a configurable earpiece attached to the telephone body near the top of the telephone body in accordance with the present invention.
Figure 9:
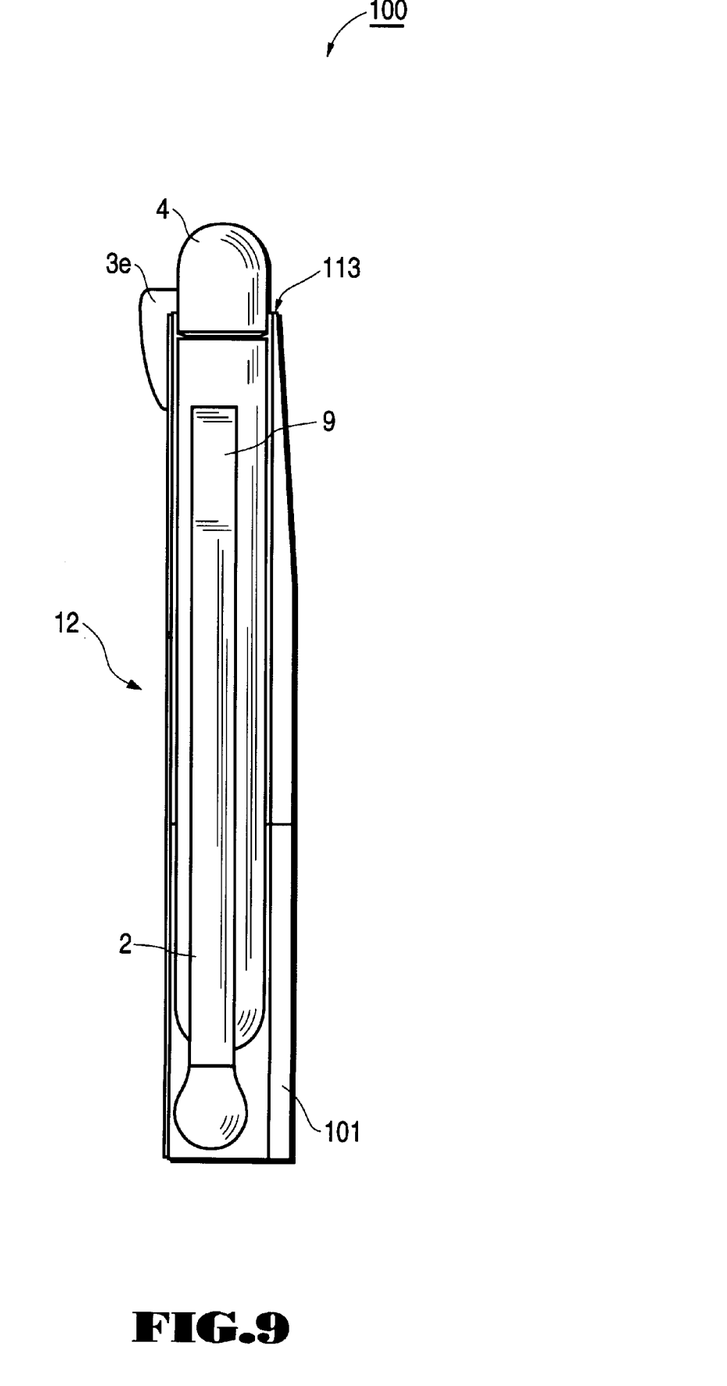
FIG. 9 is a side view of the telephone of FIG. 8 with the configurable earpiece attached to the telephone body near the top of the telephone body in accordance with the present invention.

FIGS. 7–12 illustrate an embodiment where an earpiece attaches to the telephone body near the top of the telephone body. Referring now to FIG. 7, telephone 100 is shown to include telephone body 101 which has opening 130 formed within it. Opening 130 exposes connector receptacle 32 and circuit board 34. Opening 130 is located within front surface 12 near the top of telephone 100.

The telephone of FIG. 7 includes display 106 which is shown to be disposed within telephone body 101 such that display 106 may be easily seen by a user. Display 106 is electrically coupled to the electronic circuitry of telephone 100 such that data may be displayed thereon and viewed by a user. In one embodiment display 106 is operable in response to the operation of the keys of keypad 7. In so doing, names and telephone numbers can be programmed into telephone 100 and telephone numbers entered by operating keypad 7 are displayed on display 106. In one embodiment, telephone body 101 also includes shuttle switch 120 which is coupled to the electronic circuitry of telephone 100 for selecting items displayed on display 106.

Opening 130 of FIG. 7 is adapted to receive a variety of different types of earpieces. In the embodiment shown in FIGS. 8–9, earpiece 3e is shown to be attached to telephone body 101. Earpiece 3e extends from front surface 12 and extends from top surface 113 of body 101. Earpiece 3e extends only slightly from top surface 113 and front surface 12 and is contoured so as to conform generally to the shape of telephone body 101.

Figure 10:
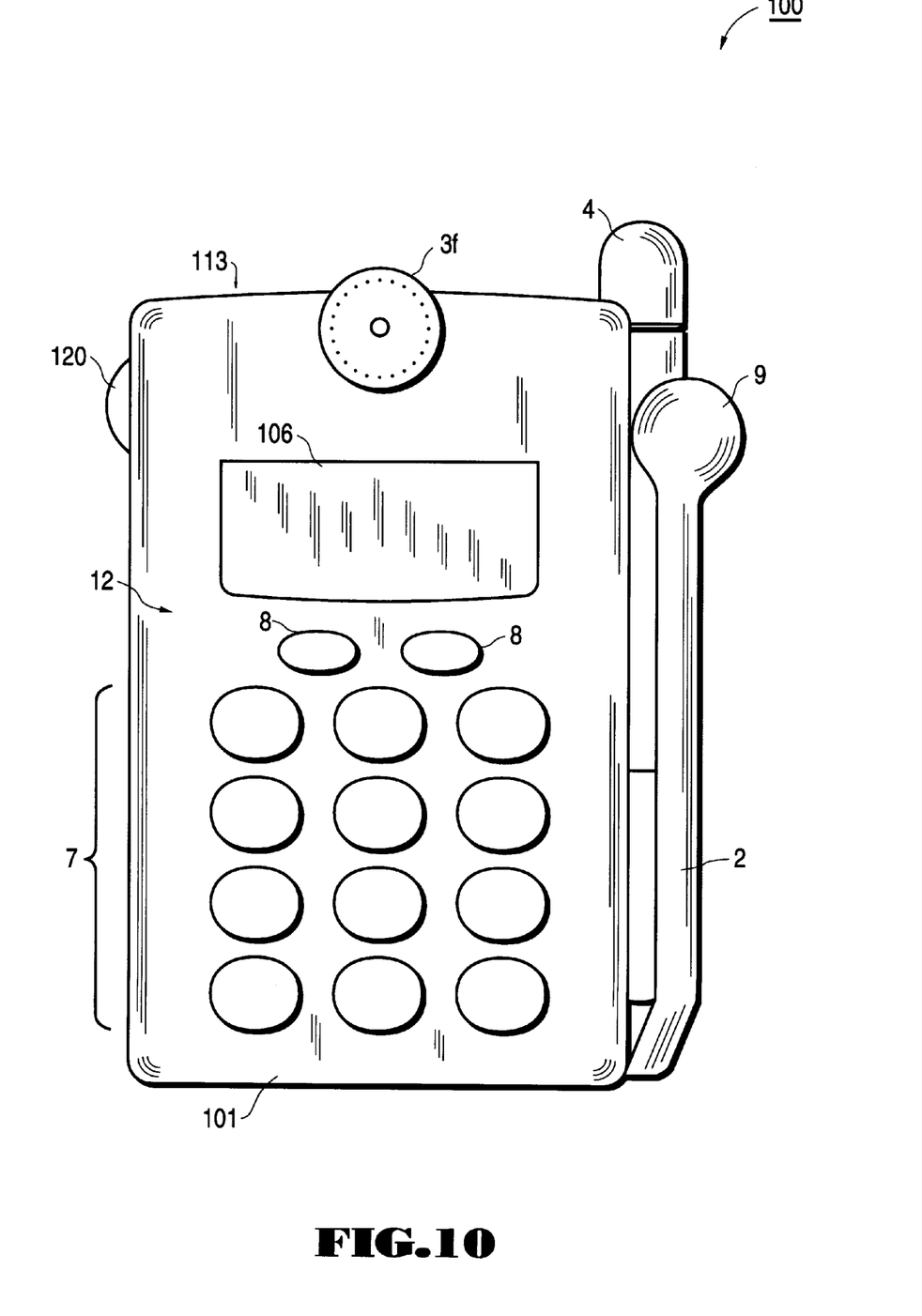
FIG. 10 is a front view of an alternate embodiment that includes a configurable earpiece that attaches to the telephone body near the top of the telephone body and which extends from the telephone body in accordance with the present invention.
Figure 11:
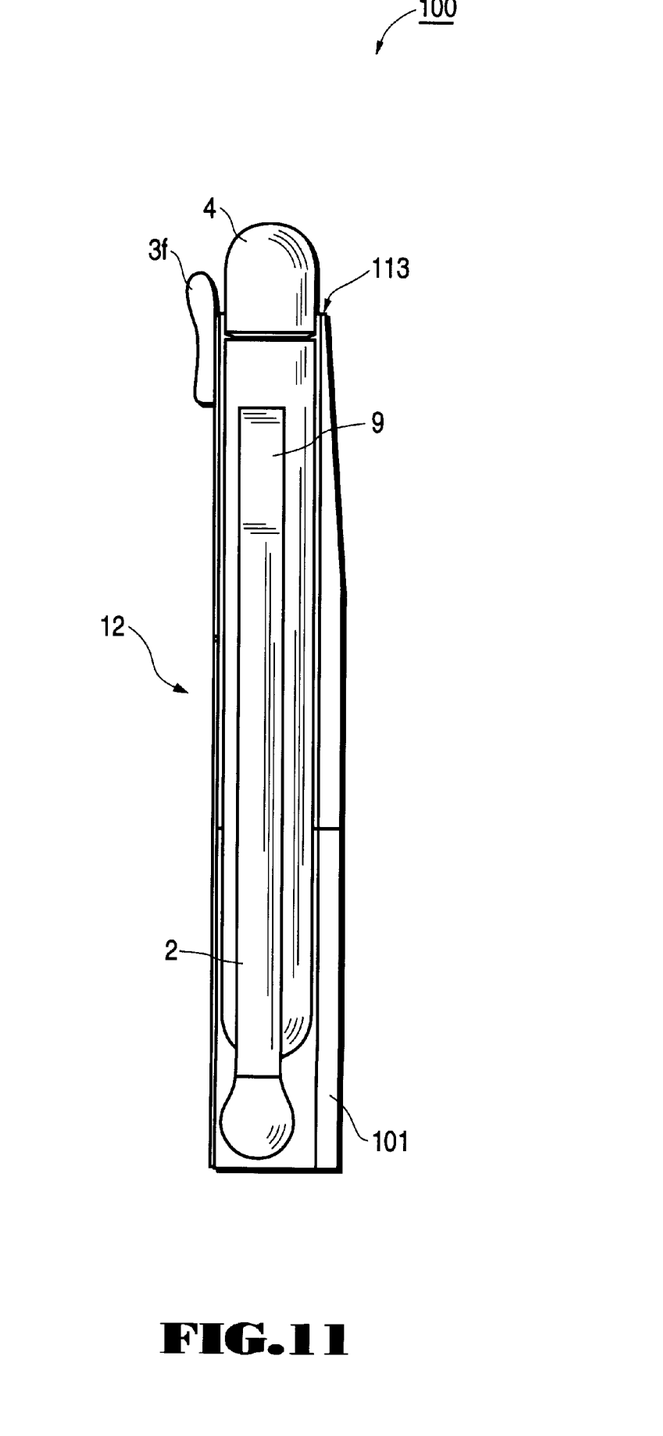
FIG. 11 is a side view of the embodiment of FIG. 10 wherein the configurable earpiece that attaches to the telephone body near the top of the telephone body extends from the telephone body in accordance with the present invention.

FIGS. 10–11 show earpiece 3f to be attached to telephone body 101. Earpiece 3f is round and extends from both front surface 12 and top surface 113. Earpiece 3f expands in size as it extends from front surface 12 so as to extend towards a user's ear when telephone 100 is operated. This allows the speaker of earpiece 3f to be positioned near the center of the user's ear for comfortable operation. In one embodiment earpiece 3f snaps into place by engaging telephone body 101. The use of a snap attachment mechanism simplifies attachment and removal of earpiece 3f.

Figure 12:
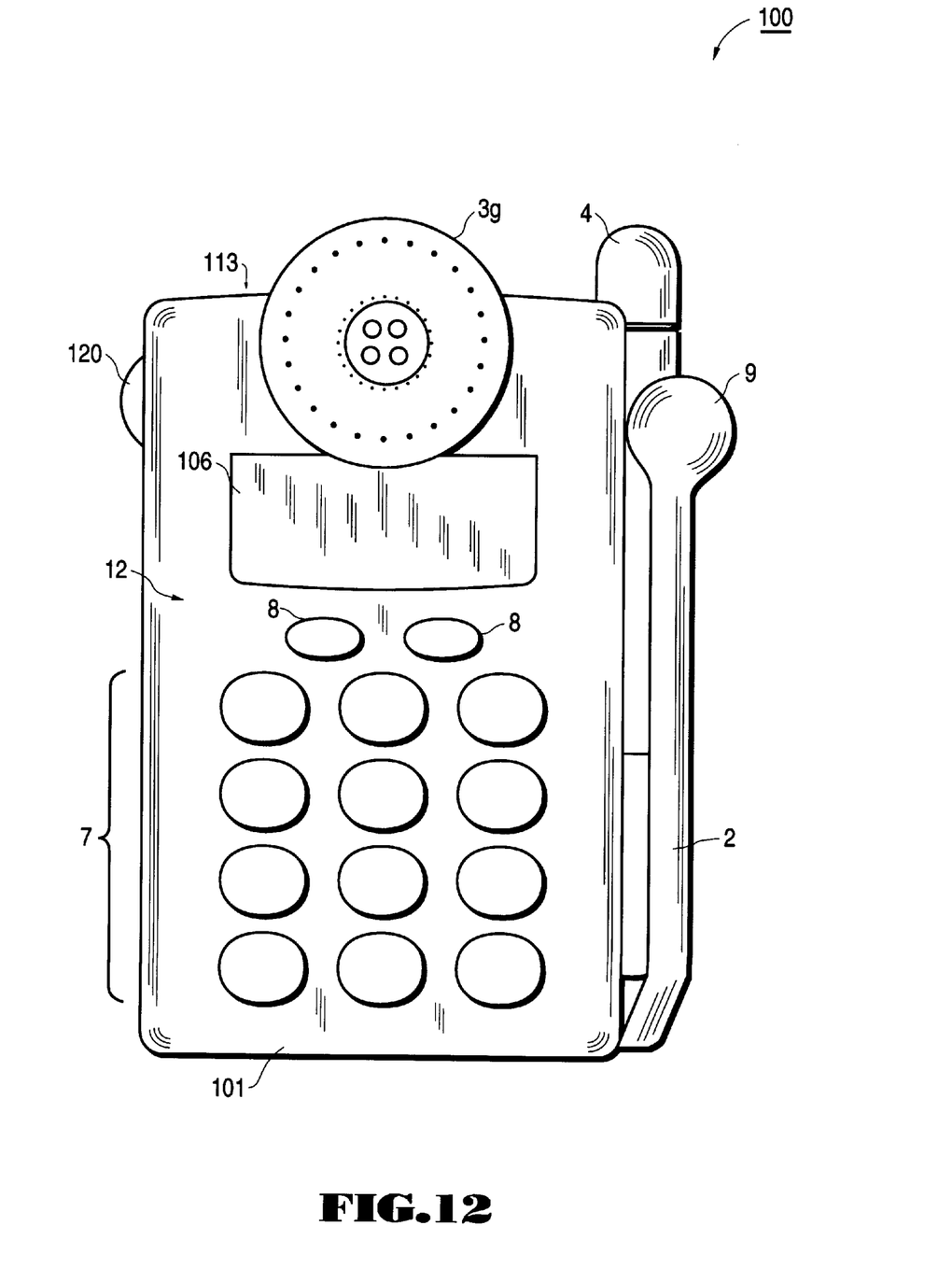
FIG. 12 is a front view of an embodiment that includes a large configurable earpiece that attaches to the telephone body near the top of the telephone body and which extends from the telephone body in accordance with the present invention.
Figure 13:
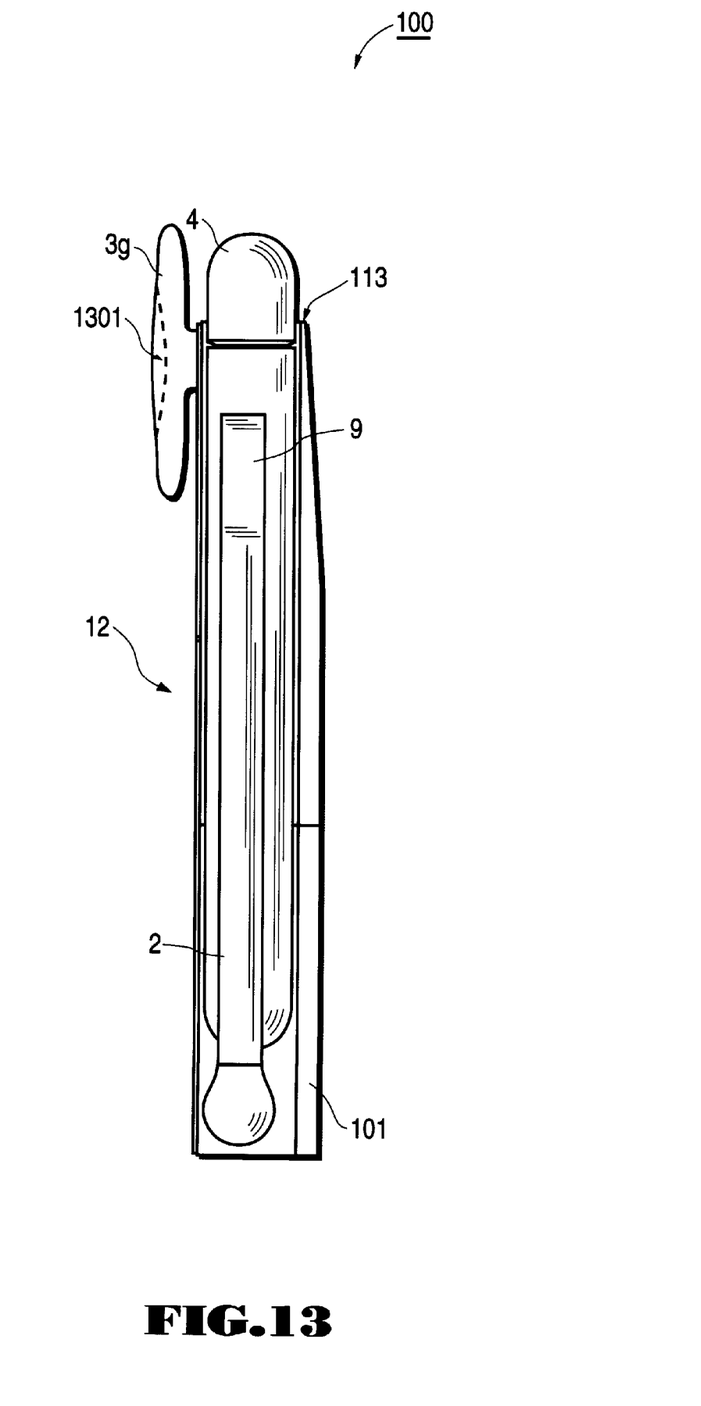
FIG. 13 is a side view of the embodiment of FIG. 12 wherein the large configurable earpiece attaches to the telephone body near the top of the telephone body and extends from the telephone body in accordance with the present invention.

Alternatively, a large earpiece which extends from both front surface 12 and top surface 113 such as earpiece 3g of FIGS. 12–13 is attached to telephone body 100. Earpiece 3g expands in size as it extends from front surface 12. Recess 1301 is shown to extend into earpiece 3g. The large size of earpiece 3g and the distance that earpiece 3g extends from front surface 12 allows earpiece 3g to accommodate various users having a wide variety of respective ear shapes and sizes. The larger size of earpiece 3g also allows a user to easily and quickly form a coupling with the user's ear and optimally locate the speaker with respect to the user's ear.

Earpieces 3a–3g may be formed of any of a number of different materials. In one embodiment, earpieces 3a–3g are made of plastic. In another embodiment, earpieces 3a–3g are made of both soft plastic and hard plastic such that the portions of the earpiece that contact the user's ear are made of soft plastic. Alternatively, leather or fabric may be used so as to allow for a comfortable interface with the user's ear.

Alternatively, the speaker contained within earpieces 3a–3g may be permanently attached to the circuit board of the telephone. In this embodiment, earpieces 3a–3g are formed such that they do not include a speaker. Thus, earpieces are easily attached and changed without the need for coupling a speaker each time an earpiece is attached.

Telephones 10 and 100 of FIGS. 1–13 may be configured to meet the needs of a variety of different users simply inserting a suitable earpiece. Thus, the present invention reduces manufacturing cost because there is no need to make a totally different telephone body to accommodate each earpiece design. Moreover, in the present invention a user can readily determine whether the earphone is optimally located with respect to the user's ear by selecting an earpiece having an appropriate shape. This allows a user to more quickly couple the telephone to the user's ear.

The configurable earpiece of the present invention may be used in any of a number of different telephone designs. For example, the configurable earpiece of the present invention may be used in a telephone which does not have a boom mike. In addition, the configurable earpiece of the present invention may be used with a full-size telephone.

The telephone of the present invention is well suited for use in satellite communication networks and other types of communication networks. For example, the telephone of the present invention may be a satellite telephone. In addition the telephone of the present invention is well adapted for use in non-cellular radio-telephone applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the claims appended hereto and their equivalents.

We claim:

1. A configurable telephone comprising:

a telephone body having a telephone speaker receptacle disposed therein; and a plurality of configurations of a telephone earpiece, each of said plurality of configurations of said telephone earpiece adapted to be disposed within said telephone speaker receptacle for alternately coupling ones of said plurality of configurations of telephone earpiece to said telephone body.

2. The configurable telephone of claim 1 wherein at least one of said plurality of configurations of said telephone earpiece is comprised of leather.

3. The configurable telephone of claim 1 wherein at least one of said plurality of configurations of said telephone earpiece is comprised of plastic.

4. The configurable telephone of claim 1 wherein said telephone speaker receptacle further includes:

a connector receptacle.

5. The configurable telephone of claim 4 wherein said telephone body further comprises a circuit board and wherein said connector receptacle is attached to said circuit board.

6. The configurable telephone of claim 1 wherein each of said plurality of configurations of said telephone earpiece includes a threaded surface and wherein said telephone speaker receptacle has threads disposed therein such that each of said plurality of configurations of said telephone earpiece may be screwed into said telephone speaker receptacle.

7. The configurable telephone of claim 6 wherein said configurable telephone further comprises a cellular telephone.

8. The configurable telephone of claim 1 wherein said telephone body further comprises a boom containing a microphone, said boom having a first end pivotally coupled to said telephone body, said boom further having a second end adapted to be extended from said telephone body, said microphone disposed near said second end of said boom.

9. The configurable telephone of claim 8 wherein said telephone body further comprises:

a keypad.

10. The configurable telephone of claim 9 wherein said telephone body further comprises:

a display.

11. A configurable telephone comprising:

a telephone body; and means for attaching one of a plurality of configurations of a telephone earpiece to said telephone body, said means including a telephone speaker receptacle disposed within said telephone body and adapted to receive said one of a plurality of configurations of said telephone earpiece.

12. The configurable telephone of claim 11 further comprising one of a plurality of configurations of a telephone earpiece disposed in said telephone speaker receptacle.

13. The configurable telephone of claim 12 wherein each of said plurality of configurations of said telephone earpiece has a threaded surface and wherein said telephone speaker receptacle further comprises threads.

14. The configurable telephone of claim 12 wherein said telephone speaker receptacle further includes:

a connector receptacle.

15. A method for forming a telephone having a configurable telephone earpiece comprising the steps of:

a) providing a telephone body;

b) providing a telephone speaker receptacle disposed in said telephone body;

c) providing a plurality of configurations of a telephone earpiece adapted to mate with said telephone speaker receptacle; and d) coupling one of said plurality of configurations of said telephone earpiece to said telephone body by coupling said one of said plurality of configurations of said telephone earpiece with said telephone speaker receptacle.

16. The method for forming a telephone having a configurable telephone earpiece of claim 15 wherein said telephone speaker receptacle includes threads and wherein said telephone earpiece has a threaded surface and wherein step d) further comprises the step of screwing said one of said plurality of configurations of said telephone earpiece into said telephone speaker receptacle.

17. The method for forming a telephone having a configurable telephone earpiece of claim 15 wherein said telephone body includes a circuit board and wherein said telephone speaker receptacle includes a connector receptacle mechanically attached to said circuit board, and wherein step d) further comprises the step of: pressing said one of said plurality of configurations of said telephone earpiece into said telephone speaker receptacle such that said connector engages said connector receptacle so as to electrically couple said one of said plurality of configurations of said telephone earpiece to said circuit board.

18. The method for forming a telephone having a configurable telephone earpiece of claim 15 further comprising the step of: removing said one of said plurality of configurations of said telephone earpiece and coupling a different one of said plurality of configurations of said telephone earpiece to said telephone body.

* * * * *